United States Patent
Jolley et al.

[11] Patent Number: 5,944,832
[45] Date of Patent: Aug. 31, 1999

[54] METHOD OF CONTROLLING MODES OF A REMOVABLE MEDIA DEVICE VIA A BUTTON FOR CONTROLLING DUAL FUNCTION POWER AND EJECTING A CARTRIDGE

[75] Inventors: David L. Jolley, Kaysville; Grant W. Dearden, Henefer, both of Utah

[73] Assignee: Iomega Corporation, Roy, Utah

[21] Appl. No.: 08/929,966

[22] Filed: Sep. 15, 1997

[51] Int. Cl.⁶ ...................................................... G06F 3/02
[52] U.S. Cl. ........................... 713/350; 713/340; 713/324
[58] Field of Search ........................ 395/750.01–750.08; 713/310, 320, 322, 323, 324, 330, 340, 350

[56] References Cited

U.S. PATENT DOCUMENTS 5,016,112  5/1991  Nakajima et al. ......................... 386/38
5,355,357  10/1994  Yamamori et al. .................... 369/75.2

*Primary Examiner*—Thomas C. Lee
*Assistant Examiner*—Harold Kim
*Attorney, Agent, or Firm*—Woodcock Washburn Kurtz Mackiewicz & Norris LLP

[57] ABSTRACT

Method and apparatus are disclosed for controlling the power modes of a removable media device as well as ejecting a cartridge from the removable media device. The method comprises the steps of identifying the current mode of the device; identifying whether a cartridge is presently located in the device; upon receiving a signal from the dual function button, depending upon the current power mode and whether a cartridge is located in the device, transmitting signals to the appropriate components of the device to either eject the cartridge or power on/off various components of the media device. The apparatus comprises a single button and a microprocessor for responding to signals transmitted from the dual function button.

4 Claims, 4 Drawing Sheets

METHOD OF CONTROLLING MODES OF A REMOVABLE MEDIA DEVICE VIA A BUTTON FOR CONTROLLING DUAL FUNCTION POWER AND EJECTING A CARTRIDGE

FIELD OF THE INVENTION

This invention relates generally to storage subsystems for computer systems. More particularly, the present invention relates to methods and apparatus for controlling the power states of an removable storage device as well as ejection of a media cartridge from the device.

BACKGROUND OF THE INVENTION

Generally, an removable media device such as that used for reading and storing information to electro-magnetic disk has a means to allow the user to eject the media from the device. Typically, the means is a button located on the external portion of the device. In most media drives, the ejection of the media cartridge from the device is accomplished electro-mechanically. As a consequence, an external eject button may have numerous electrical leads connected thereto on the internal portion of the device. The electrical leads transmit signals from the button to a microprocessor controller or other device that operates the mechanical ejection of the cartridge from the device.

Typically, a removable media device also provides a mechanism by which power to the device can be controlled. In a simple example, a button or switch may be provided on the external portion of the device by which the power to the device may be switched on and off. As with the eject button described above, an on/off power button may have numerous electrical leads connected thereto.

Modern removable storage devices have become much more sophisticated and now have the capability to operate at multiple power states beyond the traditional on/off modes. For example, a device may have a reduced power mode in which portions of the device do not receive electrical power while other portions of the same device continue to receive the necessary electrical voltage. It has been proposed that multiple power states may be controlled by multiple buttons located on the external surface area of the device.

The size of removable media devices has decreased significantly in recent years. The devices have been miniaturized to a point that there is limited space on the useful external surface of the devices on which to provide external controls such as an eject button and/or a power button. Further, the reduction in size of the devices has made it more difficult to connect the various internal wiring to the various external buttons and switches.

Additionally, it can become confusing to the operator of the media device to have multiple buttons for controlling various power states of the drive as well as an additional button to eject a cartridge from the device. Further, where there are multiple buttons, there is the likelihood that an operator may inadvertently depress the incorrect button.

In view of the foregoing, there is a need for a method and apparatus for controlling the ejection of a media cartridge from a media device as well as control the various power states in which the media device may operate.

SUMMARY OF THE INVENTION

Accordingly, it is the general object of the current invention to provide a method and apparatus for controlling the ejection of a media cartridge from a removable media device as well as control the various power states in which the media device may operate.

Briefly, this object, as well as other objects of the current invention, is accomplished in a removable media storage device that accepts a cartridge and has a first and second mode. The inventive method of controlling the modes of the removable media device via a button on an exterior surface of the removable media storage device, comprises the steps of: (a) identifying the current mode of the media device; (b) identifying whether a cartridge is located in the device; (c) if the current mode is the first mode and the device has a cartridge located therein, upon receiving a signal from the button, transmitting a signal to cause the cartridge to be ejected from the device; (d) if the current mode is the first mode and the device does not have a cartridge located therein, upon receiving a signal from the button, entering the second mode; (e) if the current power mode is the second mode, upon receiving a signal from the button, entering the first mode; and (f) if the current mode is the second mode, upon receiving a signal that a cartridge has been inserted into the device, entering the first mode. In the presently preferred embodiment, the modes controlled by the method are power modes and the cartridge is a disk cartridge.

According to another aspect of the present invention, there is provided an apparatus for controlling the mode of a removable media device that accepts a cartridge and has a first and second mode. The apparatus comprises: a button located on the exterior of the removable media storage device; and a microprocessor electrically connected to said button where the microprocessor has instructions located therein for performing the following steps: (a) identifying the current mode of the media device; (b) identifying whether a cartridge is located in the device; (c) if the current mode is the first mode and the device has a cartridge located therein, upon receiving a signal from the button, transmitting a signal to cause the cartridge to be ejected from the device; (d) if the current mode is the first mode and the device does not have a cartridge located therein, upon receiving a signal from the button, entering the second mode; (e) if the current power mode is the second mode, upon receiving a signal from the button, entering the first mode; and (f) if the current mode is the second mode, upon receiving a signal that a cartridge has been inserted into the device, entering the first mode. In the presently preferred embodiment, the modes controlled by the method are power modes and the cartridge is a disk cartridge.

Additional features and advantages of the present invention will become evident hereinafter.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific methods and instrumentalities disclosed. In the drawings.

DETAILED DESCRIPTION OF THE INVENTION

A preferred embodiment of the invention will now be described with reference to the FIGURES. The description provided herein is for exemplary purposes only and is not intended in any way to limit the scope of the invention.

Figure 1:
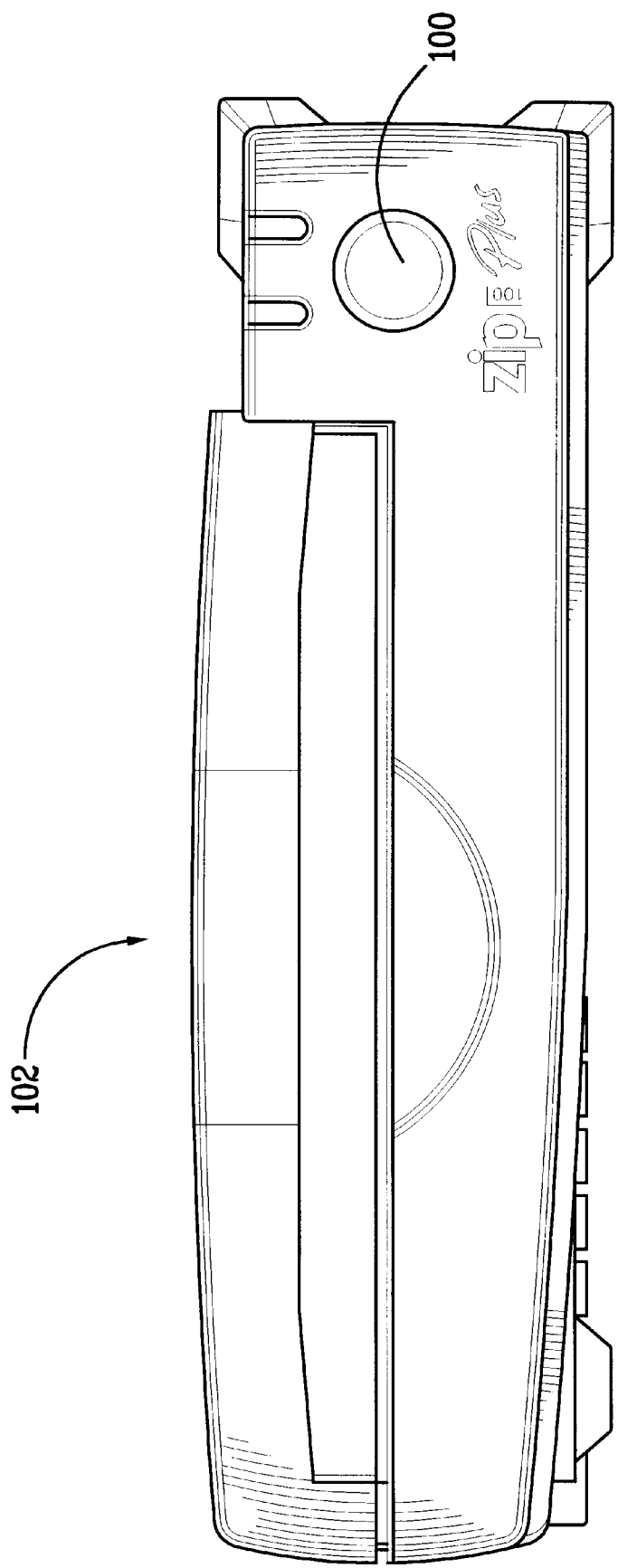
FIG. 1 is an exterior perspective view of the inventive dual function button positioned on the exterior of a media device.

FIG. 1 provides an exterior perspective view of inventive dual function button 100 positioned on the exterior of media device 102. This single button 100 can be used to eject a media cartridge (not shown) from device 102 or cause device 102 to enter into any one of several possible power states.

Figure 2:
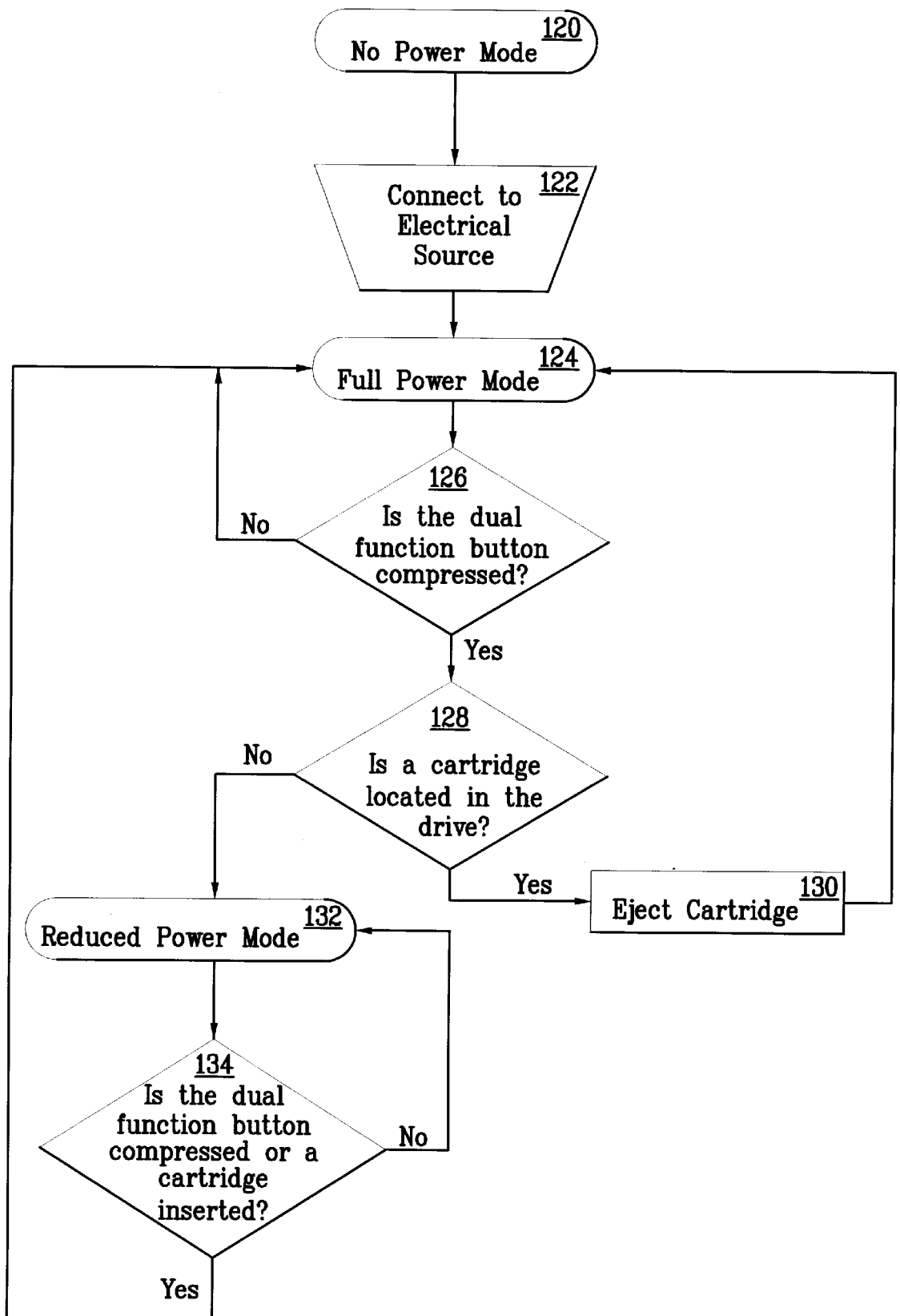
FIG. 2 is a flow chart of the process by which the power states of the media device and ejection are controlled using the inventive dual function button.

FIG. 2 provides a state/flow diagram depicting the various power states and operations performed by media device 102 in response to pushing dual function button 100. In the preferred embodiment, media device 102 may have one of three basic power states: off power mode 120; full power mode 124; and reduced power mode 132.

Initially, as shown in FIG. 2, the device is in off power mode 120, i.e. the device has no electrical connectivity. When the device is connected to an appropriate electrical source 122, the second power state, full power mode 124 is entered. Prior to entering full power mode 124, device 102 will perform a full power reset. After device 102 is in full power mode 124, data can be read from or written to media. This can happen in two ways: (1) if a media cartridge is inserted while device 102 is in full power mode 124, or (2) a cartridge was located in device 102 when power was applied. In either case, the media will be brought into position within device 102 so that data can be read from or written to the cartridge.

Device 102 remains in full power mode 124 until dual function button 100 is depressed (step 126). If, upon depressing dual function button 100 a cartridge is located in device 102, the cartridge is ejected from device 102 which continues in full power mode 124 (step 130). However, if upon depression of dual function button 100 a cartridge is not located in device 102, device 102 enters reduced power mode 132.

Upon entering reduced power mode 132, device 102 shuts down substantially all operations so as to reduce the amount of power used. Because most features of media device 102 are powered off in reduced power mode 132, device does not respond to commands or actions directed to device 102 from the device interface. Only those features of device 102 needed to restore device 102 to full power mode 124 remain powered up. However, for particular devices, such as the ZIPPLUS™ manufactured by Iomega Corporation, other features may remain powered up. For example ZIPPLUS™ provides interface pass-through to other devices that may be connected to it. Such interfaces to other devices should not be powered off when the dual function button 100 is depressed. As a result, reduced power mode 132 may also allow for continued pass-through communication. While in reduced power mode 132, if the dual function button 100 is depressed or a cartridge is inserted into device 102, device 102 returns to full power mode 124.

It should be noted that reduced power mode 132 is different from a "sleep" mode which a media device may enter after a period of inactivity. In the "sleep" mode, the device will respond to commands but in the reduced power mode 132, the device will not.

Figure 3:
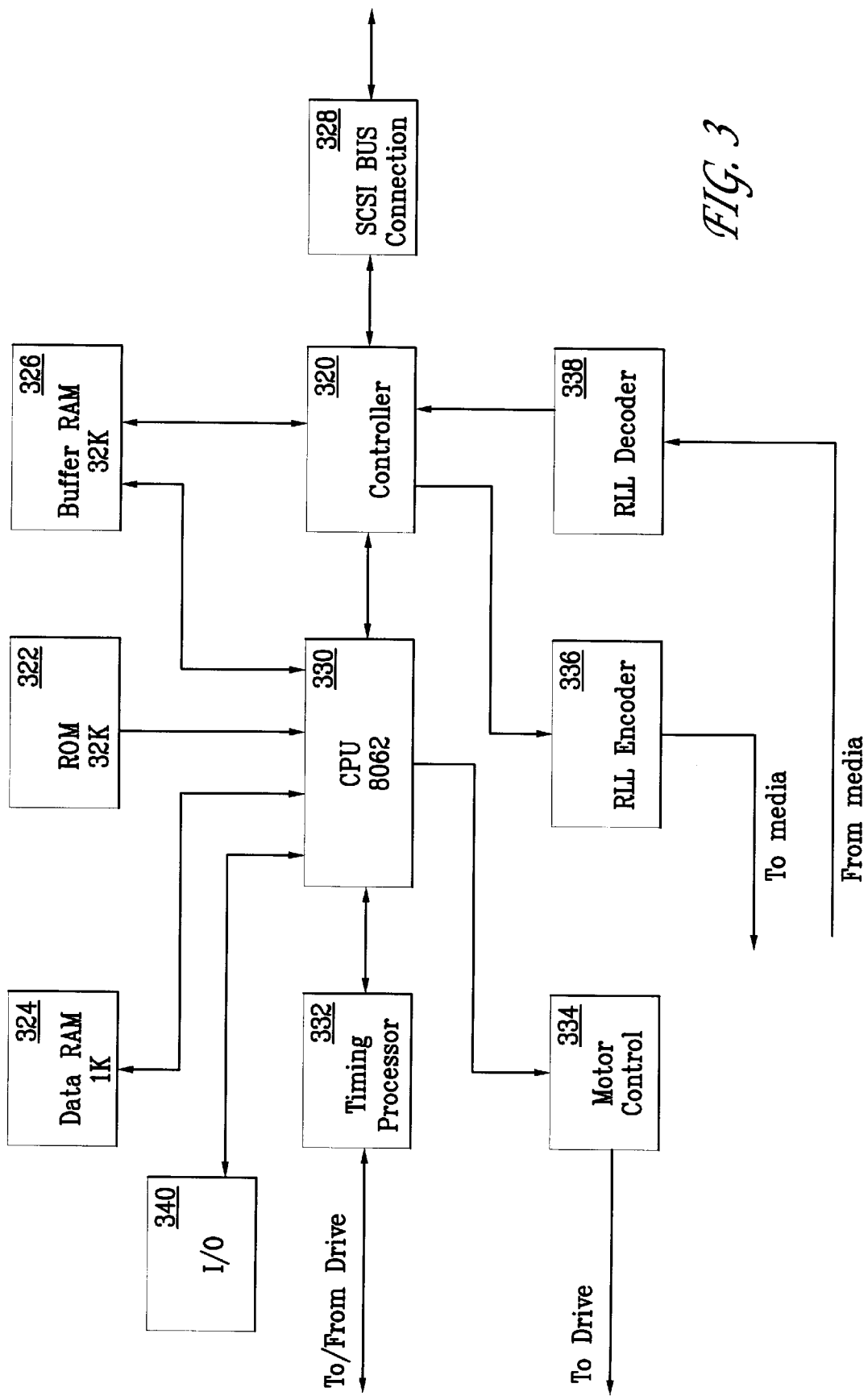
FIG. 3 is a functional block diagram of a removable media device implemented with a SCSI interface.

FIG. 3 presents a functional block diagram of device 102 implemented with small computer systems interface (SCSI) 328. The device electronics comprise ten main subcomponents: a 40 pin SCSI bus connection 328; a CPU 330, for example, an 8052; a 1 k Data RAM memory 324 for executing local programs; a 32 k ROM memory 322 for storage of programs; a controller circuit 320, such as an AIC-7166 manufactured by Adaptec, which controls buffer management of data to and from the media, media interface, and processor interface via the SCSI bus; Timing Processor 332 for providing timing signals to the servo motors and the read/write channel; motor control circuitry 334; an RLL encoder 336 for writing data to the media; an RLL decoder 338 for reading data from the media; and I/O controller 340.

Figure 4:
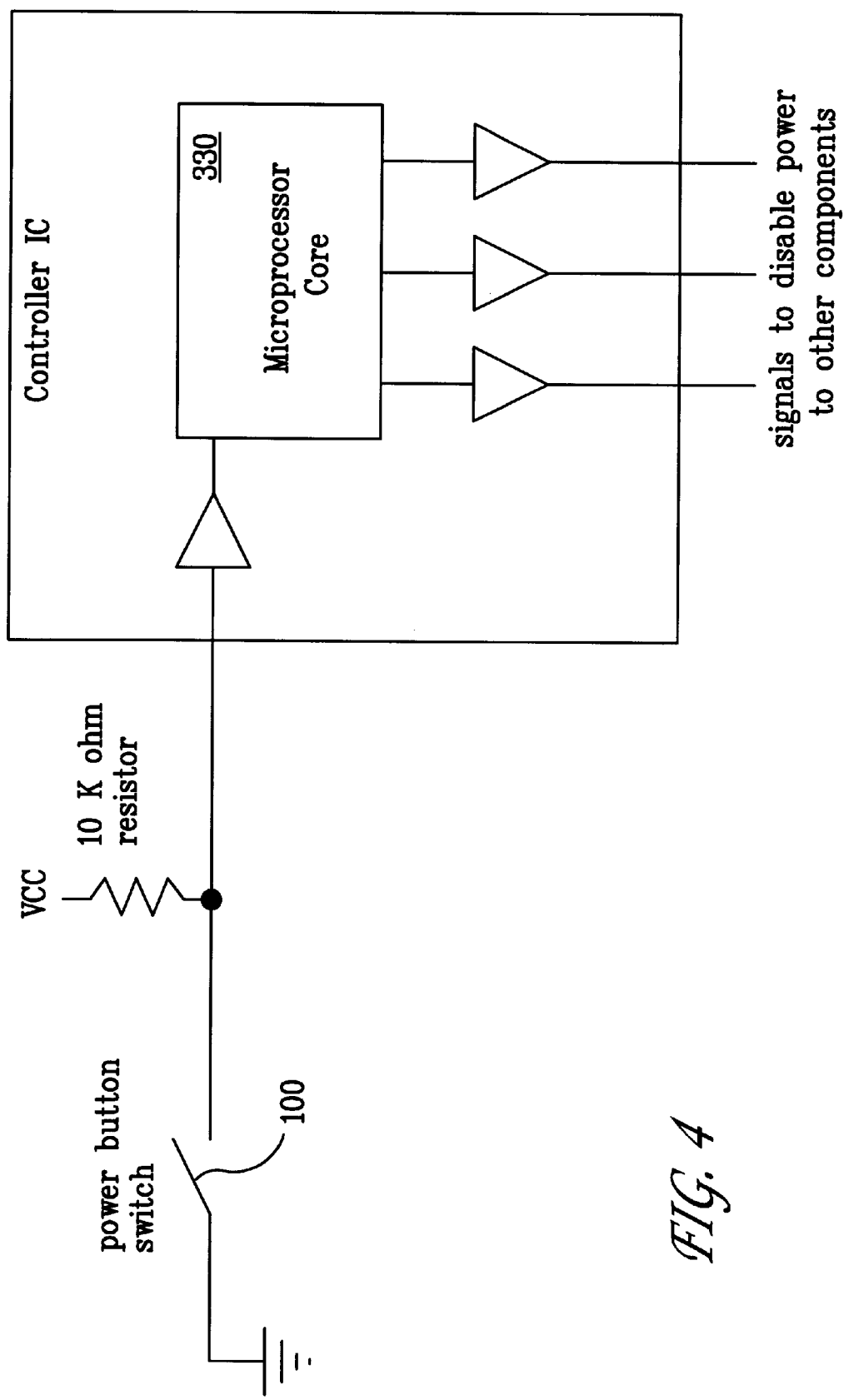
FIG. 4 is a block diagram of removable media device controller hardware in accordance with a preferred embodiment of the present invention.

FIG. 4 is a block diagram of the interface between dual function button 100 and microprocessor 330 in accordance with a preferred embodiment of the present invention. As shown, dual function button 100 is electrically connected to microprocessor 330. In response to a signal from dual function button 100, microprocessor 330 sends a signal or a series of signals to various subcomponents of media device 102 which function either to change the power state of device 102 or eject a cartridge from device 102. The particular signals that are transmitted by microprocessor 330 in response to a signal from button 100 and therefore the particular action that is taken, depend upon the current power mode and whether a cartridge is located in device 102 when the signal is received from button 100. Thus, in accordance with the above description of FIG. 2, if device 102 is in full power mode 124 and no cartridge is located in the device when a signal is received by microprocessor 330 from dual function button 100, microprocessor 330 responds by entering reduced power mode 132. To enter reduced power mode 132, device 102 sends the appropriate signals to those portions of device 102 which should be powered down. Microprocessor 330 reacts similarly to send the appropriate signals in response to a signal from dual function button 100.

As the foregoing illustrates, the present invention is directed to methods and apparatus for controlling the modes of a removable media device and the ejection of a cartridge therefrom. The present invention may be embodied in other specific forms without departing from the spirit or essential attributes thereof. For example, the removable media device may have more than two modes of operation. Further, the media cartridge may be any of several different media types such as magnetic disk, CD-ROM, etc. Accordingly, reference should be made to the appended claims, rather than to the foregoing specification, as indicating the scope of the invention.

What is claimed is:

1. In a removable media storage device that accepts a cartridge and has at least a first and second mode, a method of controlling modes of the removable media storage device via a button on an exterior surface of the removable media storage device, comprising the steps of:

(a) identifying a current mode of the removable media storage device;

(b) identifying whether the cartridge is located in the removable media storage device;

(c) if the current mode is the first mode and the removable media storage device has the cartridge located therein, upon receiving a signal from the button, transmitting an eject signal to cause the cartridge to be ejected from the removable media storage device;

(d) if the current mode is the first mode and the removable media storage device does not have the cartridge located therein, upon receiving a signal from the button, entering the second mode;

(e) if the current mode is the second mode, upon receiving a signal from the button, entering the first mode; and (f) if the current mode is the second mode, upon receiving a signal that the cartridge has been inserted into the removable media storage device, entering the first mode.

2. The method of controlling modes as recited in claim 1 wherein said modes are power modes.

3. The method of controlling modes as recited in claim 1 wherein said cartridge comprises a disk cartridge.

4. An apparatus for controlling modes of a removable media storage device that has an exterior, accepts a cartridge, and has a first and second mode, comprising:

a button located on the exterior of the removable media storage device; and a microprocessor electrically connected to said button, said microprocessor having instructions located therein for performing the following steps:

(a) identifying a current mode of the removable media storage device;

(b) identifying whether the cartridge is located in the removable media storage device;

(c) if the current mode is the first mode and the removable media storage device has the cartridge located therein, upon receiving a signal from the button, transmitting an eject signal to cause the cartridge to be ejected from the removable media storage device;

(d) if the current mode is the first mode and the removable media storage device does not have the cartridge located therein, upon receiving a signal from the button, entering the second mode;

(e) if the current mode is the second mode, upon receiving a signal from the button, entering the first mode; and (f) if the current mode is the second mode, upon receiving a signal that the cartridge has been inserted into the removable media storage device, entering the first mode.

\* \* \* \* \*